(12) United States Patent
Laughman et al.

(10) Patent No.: US 7,453,918 B2
(45) Date of Patent: Nov. 18, 2008

(54) PULSED RF HIGH PRESSURE $CO_2$ LASERS

(75) Inventors: Lanny Laughman, Bolton, CT (US);
Vernon Seguin, Windsor, CT (US);
Peter P. Chenausky, Avon, CT (US);
Robert Henschke, East Hampton, CT (US); Eric R. Mueller, West Suffield, CT (US)

(73) Assignee: Coherent, Inc., Santa Clara, CA (US)

( * ) Notice: Subject to any disclaimer, the term of this patent is extended or adjusted under 35 U.S.C. 154(b) by 55 days.

(21) Appl. No.: 11/484,916

(22) Filed: Jul. 12, 2006

(65) Prior Publication Data

US 2007/0041418 A1    Feb. 22, 2007

Related U.S. Application Data

(60) Provisional application No. 60/707,502, filed on Aug. 11, 2005.

(51) Int. Cl.
*H01S 3/22* (2006.01)
(52) U.S. Cl. .......................................... 372/55; 372/61
(58) Field of Classification Search .................. 372/55, 372/61
See application file for complete search history.

(56) References Cited

U.S. PATENT DOCUMENTS

| | | | |
|---|---|---|---|
| 4,618,961 A * | 10/1986 | Sutter, Jr. ..................... | 372/87 |
| 5,237,580 A | 8/1993 | Mefferd ........................ | 372/34 |
| 5,283,797 A | 2/1994 | Mefferd ........................ | 372/34 |
| 5,479,428 A * | 12/1995 | Kuzumoto et al. ............ | 372/61 |
| 6,192,061 B1 | 2/2001 | Hart et al. ..................... | 372/87 |
| 6,697,408 B2 | 2/2004 | Kennedy et al. .............. | 375/55 |
| 6,788,722 B1 | 9/2004 | Kennedy et al. .............. | 372/64 |
| 6,826,204 B2 | 11/2004 | Kennedy et al. .............. | 372/10 |
| 7,046,709 B2 | 5/2006 | Seguin et al. .................. | 372/64 |
| 2005/0175054 A1 | 8/2005 | Shackleton et al. ........... | 372/55 |
| 2006/0029116 A1 * | 2/2006 | Shackleton et al. ........... | 372/55 |

OTHER PUBLICATIONS

A.J. DeMaria, Review of CW High-Power $CO_2$ Lasers, *Proceedings of the IEEE*, vol. 61, No. 6, Jun. 1973, pp. 731-748.

* cited by examiner

*Primary Examiner*—Dung T Nguyen
(74) *Attorney, Agent, or Firm*—Stallman & Pollock LLP

(57) ABSTRACT

An improved laser system includes a sealed-off, RF excited, diffusion cooled, high pressure, short pulsed, high peak power waveguide and slab $CO_2$ laser that avoids problems typically associated with obtaining a diffused discharge at high gas pressures, without arcing and without corona, while maintaining the unsaturated gain and gas temperature experienced at low pressures and scaling to higher pressures. Such a system has a long operating life-time, and is capable of operation at high gas pressures to obtain relative fast rise and fall time pulses. The system emits relatively short pulse widths, with pulse energies up to and exceeding 30 mJ, with reasonably high pulse repetition rates. The system also has a low pulsed RF power duty cycle, thereby enabling the generation of high peak power pulses, as well as reasonable average power and reasonably high peak powers.

12 Claims, 8 Drawing Sheets

PULSED RF HIGH PRESSURE $CO_2$ LASERS

RELATED APPLICATION

This application claims the benefit of U.S. Provisional Application No. 60/707,502, filed on Aug. 11, 2005, by Laughman et al., and titled "Pulsed RF, High Pressure $CO_2$ Lasers." Provisional Application No. 60/707,502 is hereby incorporated by reference herein in its entirety.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of contract number F33615-02-1257 awarded by the U.S. Air Force Research Labs.

TECHNICAL FIELD OF THE INVENTION

The present invention relates to laser systems and devices, such as those including pulsed RF high pressure lasers.

BACKGROUND

RF excited, sealed-off, diffusion cooled $CO_2$ lasers operate at relatively low pressures, such as pressures less than 150 Torr, with 50-100 Torr being typical. $CO_2$ lasers that operate at higher gas pressure can generate output pulses with faster rise and fall times, as well as with shorter pulse widths, than $CO_2$ lasers that operate at lower gas pressures. In addition, higher pressure $CO_2$ lasers are capable of emitting higher peak power pulses. Faster rise and fall times, shorter pulse widths and higher peak power laser pulses are desirable for many material processing applications, such as hole drilling.

Generally, the gain line-width of $CO_2$ lasers increases by approximately 5 MHz per Torr of pressure under normal excitation above threshold conditions. This increased line-width with increased pressure provides some frequency tunability. For example, at 500 Torr, the gain line width of $CO_2$ lasers is approximately 2.5 GHz. While this gain band-width is modest by solid-state laser standards, it is still useful in tuning the $CO_2$ laser to some absorption lines of selected gases and vapors of interest, such as in remote sensing applications and in pumping molecular lasers operating in the THz region of the spectrum.

Due to the very narrow pumping lines of the heavy molecules used in a THz laser, even a limited frequency tuning capability enables one to adjust the pumping wave-length of the $CO_2$ laser to the peak of the absorption line of the molecular laser, thereby increasing pumping efficiencies and laser output power. This tunability also increases the number of THz laser lines by enabling THz laser operation with molecules that presently cannot be pumped with $CO_2$ lasers.

Unfortunately, it is difficult to obtain $CO_2$ discharges having a uniform "glow," without arcs or hot spots in the discharge, as the gas pressure is increased above approximately 150 Torr. In addition, the large percentage of He making up the $CO_2$ laser gas mixture, such as a ratio of six parts He to one part each of $CO_2$ and $N_2$, makes it easy to experience the generation of corona ionization of the gas around the hot electrode, as well as the inductors contained within the gas plenum chamber that contains the discharge along with the laser resonator. The inductors are used to equalize the RF electric field along the length of the electrode when the RF wavelength is an appreciable fraction of the electrode length.

Under present state of the art technologies, the existence of "corona" is difficult to prevent due to the high RF electric fields required to generate discharges at the higher gas pressures. These difficulties have prevented the reliable operation of RF excited, sealed-off, diffusion cooled $CO_2$ lasers above about 150 Torr.

The existence of corona ionization within the gas plenum chamber of the laser, as well as the presence of arcs or hot spots, can reduce the efficiency of the laser and, if significantly severe, prevent laser oscillation. Arcs in the laser discharge also contribute to poor beam quality, as well as to amplitude variations in laser output over time. Reduction in the efficiency of the laser occurs because the arcs tend to heat the laser gas, thereby reducing the over-population between the upper and lower laser levels of the $CO_2$ molecules. Reduction in laser efficiency from the existence of a corona occurs because the flow of current from the corona flows to the grounded metal container housing the gas plenum. This undesired current flow from the corona occurs outside of the discharge that generates optical gain, thereby representing a power loss. Grounding of the metal laser housing is desirable in order to minimize stray RF emission from the laser.

Some of the $CO_2$ pulsed laser material processing needs are being addressed by Q-switched $CO_2$ waveguide lasers. These lasers can provide up to 80 W of average power, with peak powers around 800 times the average power (approximately 65 kW peak powers). The laser also can provide super pulsed RF excitation of the discharge at a 30-50% duty cycle, with pulse repetition frequencies up to 150 KHz with continuous wave RF pumping. Pulse energies of 0.1-6 mJ can be obtained, with pulse widths of 70-200 nsec and a pulse rise time of approximately 50 nsec at approximately 100-150 Torr gas pressure. The relatively low pulse energies, coupled with the relatively higher cost associated with the need for an electro-optical (EO) crystal (usually CdTe), a polarizer, and fast electronics for switching, prevent Q-switched $CO_2$ lasers from serving many of the needs of the material processing industry.

An alternate pulse laser technology that serves an even smaller portion of the material processing industry than Q-switched lasers includes Transverse Excited Atmospheric (TEA) lasers. TEA lasers address a smaller portion of the needs of the material processing industry because TEA lasers do not have sealed off operation, long operating life times (due to sputtering of the electrode contained within the discharge that is caused by the dc discharge), or high pulse repetition frequencies, as less than 300 Hz is typical.

Most pulsed laser material processing applications are being served by super pulsed $CO_2$ wave-guide and slab lasers, with emphasis on slab laser technology. The lower pressure (typically less than 150 Torr) utilized in these lasers yields relatively long laser pulse rise and fall times (typically 30-50 microsec), as well as long pulse widths (typically greater than 30 microseconds) and a relatively high duty cycle (typically around 30-50%). These performance parameters limit the use of super pulsed wave-guide and slab lasers for some of the material processing applications that require faster rise and fall times, as well as higher peak power pulses.

To obtain the faster rise and fall times that are required for obtaining the desired superior hole qualities drilled in printed circuit board (PCB) materials, using sealed-off, low pressure, RF excited $CO_2$ slab lasers, manufacturers of such $CO_2$ laser hole drilling systems utilize optical switches to sharpen the rise and fall times of the laser pulses, such as is described in U.S. Pat. No. 6,826,204, filed Nov. 30, 2004, entitled "Apparatus For Modifying $CO_2$ Slab Laser Pulses," which is hereby incorporated herein by reference. Acousto-optical or electro-optical switches can be used to perform the pulse sharpening. This brute force approach adds considerable cost to these systems due to the addition of the optical switches and their associated electronics, as well as the necessity of using a higher output power laser to compensate for the laser energy thrown away by clipping the front and back ends of the laser pulses. The upper pulse repetition frequency required in these PCB hole drilling systems is determined by the present speed limitation associated with scanning mirror galvanometer technology, which is approximately 3 to 4 KHz at present.

Thus, there is a need in the laser material processing industry for a pulsed $CO_2$ laser that is sealed-off, has a long operating life-time and is capable of operation at high gas pressures (e.g., between 150 Torr and atmosphere) to obtain relatively fast rise and fall time pulses (less than 1 microsec). There also is a need for such a laser to emit relatively short pulse widths (5-20 microsec), with pulse energies up to and exceeding 30 mJ and having reasonably high pulse repetition rates (such as up to 10 KHz). It also is desirable for these lasers to have a low pulsed RF power duty cycle (such as 10-20%), thereby enabling the generation of high peak power pulses, as well as reasonable average power (such as approximately 50 W or more) and reasonably high peak powers (such as up to 3KW). Realizing a laser with these characteristics will satisfy laser processing applications that are not presently satisfied by the existing $CO_2$ laser technologies. Further, there is a need for tunability with the use of $CO_2$ lasers in remote sensing of gases and vapors applications, as well as in pumping THz molecular lasers.

DETAILED DESCRIPTION

Figure 1:
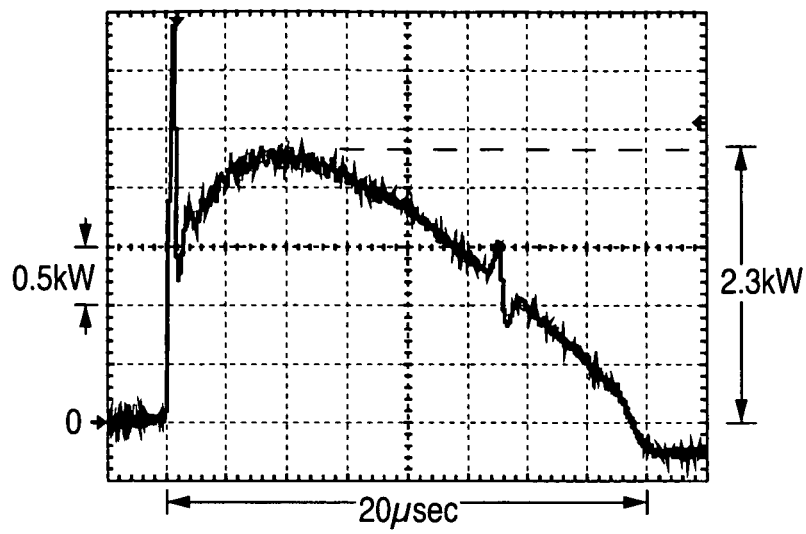
FIG. 1 is a plot showing an output power pulse generated by a laser system in accordance with an embodiment of the present invention.

Systems and methods in accordance with various embodiments of the present invention can overcome deficiencies in existing high pressure laser systems. For instance, a system in accordance with an embodiment of the invention includes a sealed-off, RF excited, diffusion cooled, high pressure, short pulsed, high peak power waveguide and slab $CO_2$ laser that avoids problems typically associated with obtaining a diffused discharge at high gas pressures, without arcing and without corona, while maintaining the unsaturated gain and gas temperature experienced at low pressures and scaling to higher pressures. Such a laser will be referred to herein as an RF excited TEA $CO_2$ laser. In material processing applications, such a laser fills the void between Q-switched and TEA lasers on one end of the $CO_2$ pulsed laser operational spectrum, and low pressure wave-guide and slab pulsed $CO_2$ lasers on the other end of the spectrum. The ability to operate at higher pressures than presently possible also provides some tunability of the laser output, which is useful in applications such as remote sensing and the pumping of THz molecular lasers.

The available power from a laser is proportional to the product of the unsaturated gain ($G_o$) and the saturated power ($P_{sat}$). For waveguide $CO_2$ lasers operating at 150 Torr, with a 8 kW peak pulse RF power operating at 50% duty cycle and emitting 100 microsecond wide laser pulses at a 1 KHz PRF, and with 85 W average power and 800W peak power, with a gain length of 225 cm, the unsaturated gain was found to be $G_o$=0.015 per cm. The saturated power $P_{sat}$ was calculated to be 275 W for the listed conditions. The values of the unsaturated gain $G_o$ and saturated power $P_{sat}$ for slab lasers are expected to be approximately the same as these values for waveguide lasers.

To maintain $G_o$ constant as the pressure is increased, in at least one embodiment of the invention, the RF pump energy in Joules divided by the product of the gas volume in liters and the gas pressure in atmosphere must remain constant, or:

$$\frac{\text{Joules}}{\text{Liter} - \text{atmosphere}} = K$$

In order to maintain this scaling relationship, the temperature of the gas should remain constant. Therefore, as the gas pressure increases for a given gas volume, the pump energy can be proportionally increased in order to maintain the same $G_o$. If the gas volume is decreased, then the input energy or the gas pressure (or both) can be adjusted so that K remains constant.

As the pump energy into the discharge is increased, the gas temperature will also tend to increase. To maintain the same $G_o$, additional cooling can be used for the discharge in order to maintain the same temperature in the discharge. Diffusion cooled $CO_2$ lasers (such as sealed off wave-guide and slab $CO_2$ lasers) are cooled by the hot (excited) $CO_2$ molecules diffusing to the wave-guiding walls containing the discharge. There can be four wave-guiding walls in a waveguide laser, and two wave-guiding walls in a slab laser that uses an unstable resonator. Upon colliding with the wave-guiding walls, the hot $CO_2$ molecules having lower excitation levels get de-populated down to the ground state, thereby cooling the gas discharge.

Additional desired cooling can be obtained by bringing the wave-guiding walls closer together. This cooling technique works because the mean-free path between collisions of the $CO_2$ molecules decreases as the pressure increases. It therefore takes longer for the hot $CO_2$ molecules to reach the cooled wave-guiding walls and become cooled. Consequently, the discharge runs hotter. Reducing the distance between the wave-guiding walls can compensate for the shorter mean free collisional paths and enable the discharge to run cooler. The proportional decrease in the separation of the wave-guiding walls with increasing pressure therefore can be used to maintain the same discharge temperature as the RF energy into the discharge and the gas pressure are increased. The use of this scaling technique can have a limit, however, due to the decreasing size of the laser aperture.

In order to maintain the unsaturated gain in a $CO_2$ laser from one given pressure to a higher pressure, the ratio of input energy to (gas volume times gas pressure), as well as the discharge temperature, can be maintained at a constant value in at least one embodiment. The gas discharge temperature can be maintained constant by reducing the separation between the wave-guiding walls in proportion to the increase in the gas pressure, or, alternatively, in proportion to the reduction in the mean-free path between colliding $CO_2$ molecules as the pressure is increased.

The thermal conductivity of the wave-guiding walls can also play an important role in the cooling of the discharge. To conduct the added heat away from the discharge in high pressure diffusion cooled laser operation, a BeO ceramic material can be used. BeO has an order of magnitude higher thermal conductivity than alumina, which frequently is used in lower pressure (less than 150 Torr) $CO_2$ lasers because of its lower cost. The additional capacitance provided by the addition of a dielectric between the two RF electrodes also acts to stabilize the discharge, thereby allowing higher RF peak powers to be deposited into the discharge before the onset of discharge instabilities, such as is explained in U.S. Patent Publication No. 2006/0029116, published on Feb. 9, 2006, and U.S. patent application Ser. No. 10/773,506, filed Feb. 6, 2004, each hereby incorporated herein by reference, for lower pressure situations. Dielectrically coupled discharges can be important for operating $CO_2$ lasers at higher gas pressures.

Another technique that can be used for additional cooling is to provide passages for coolant flow in both the hot and ground electrodes for slab lasers operating at low pressures (such as below 150 Torr), such as is described in U.S. Pat. No. 5,283,797, issued on Feb. 1, 1994, and U.S. Pat. No. 5,237,580, issued on Aug. 17, 1993, both of which are hereby incorporated herein by reference. The coolant used in the hot electrode has low RF electrical conductivity in order not to lose significant RF power into the coolant. The RF electrical resistivity of typically used water-based coolant liquid having a corrosive inhibitor additive to prevent corrosion in aluminum cooling coils (such as DOW FROST HD available from Dow Chemical Company of Midland, Mich.) is too low. Its use as a coolant results in an excessive RF power loss. For electro-optics modulator applications, a mixture of approximately 10% of a corrosion inhibitor such as Optishield®, sold by OptiTemp of Trvesoe City, Mich., and approximately 90% de-ionized water satisfies the requirements of aluminum corrosion prevention, sufficient cooling capability, and high RF resistance. Copper electrodes are not acceptable within the plenum chamber of $CO_2$ laser unless the copper is coated with a metal such as Nickel. Copper is a getter of oxygen ($O_2$) as it oxidizes, thus changing the laser gas mixture from an optimum value with time of laser operation. Consequently, aluminum cooling passages are commonly used for $CO_2$ lasers electrodes.

The use of higher RF excitation frequencies with increasing gas pressure has the desirable effect of pushing the initiation of plasma instabilities up to higher gas pressures and to higher energy density within the gas discharge. Unfortunately the cost of the RF power supply increases with increasing frequencies so a cost verses performance trade-off is required.

As the RF energy, deposited into the discharge, and the gas pressure of the laser are increased, the occurrence of corona discharges becomes increasingly problematic. Corona typically occurs along the edges of the hot RF electrode, with the largest amount of corona occurring at both ends of the hot electrode. Corona also occurs in the inductors used to smooth out the voltage along the length of the electrode. Encapsulating the hot electrode within a dielectric can greatly reduce the electrode corona.

There are many ways to encapsulate a metal electrode with a dielectric. One effective technique is to round-off and smooth the edges of the metal electrode, as well as to embed the electrode in a low dielectric constant insulator. A material such as Macor®, available from Dow Corning, or fused silica can be an excellent dielectric candidate for this application. Macor is a machinable glass mica ceramic, such that a rectangular trench can easily be machined in the material to hold the electrode. Macor has a dielectric constant of about 6 at the RF frequencies of interest (100 MHz), and has a dielectric constant that is slightly smaller than BeO. Fused silica has an even lower dielectric constant than Macor, and can be machined by diamond turning. Fused silica also is a candidate for use. The use of a low dielectric constant material can be important because it reduces the RF capacitive coupling to the grounded laser metal housing, which can be desirable from a laser efficiency stand point. It also can be important to have a tight fit between the dielectric cover over the aluminum electrode and the aluminum in order to prevent corona between their interfaces.

It can be important to keep a material such as Macor away from the discharge, as such a material can tend to "flake-off" particles when exposed to a discharge. Silica thus can be preferable for certain applications. Since aluminum has a thermal expansion coefficient of approximately three times that of Macor, it can be important to leave about 0.001 to 0.002 of an inch clearance between the ends of the electrode and the trench machined in the Macor into which the electrode is placed. No corona was found to occur within this separation up to a pressure of about 600 Torr, with the application of 12 KW of RF peak power at 100 MHz in a 2.5 microsecond wide RF pulse deposited into a discharge contained within a 1.5 mm deep by 3.0 mm wide BeO waveguide. For larger clearances between the ends of the electrode and the trench machined in the Macor, or at sufficiently higher RF energy deposited into the discharge, corona did occur in the separation. In such cases, the corona within the separation could be extinguished by reducing the inductances of the last coils on each end of the electrodes. Lowering the inductance of these two inductors in effect lowers the voltage on each end of the electrode without causing an appreciable loss in laser output power.

Another dielectric encapsulation technique for a hot RF electrode effective in getting rid of the corona is to deposit the metal electrode in thin film form directly on the BeO dielectric, such as by using known deposition techniques. The deposited metal electrode can be coated with a dielectric, such as a glass frit, which then can be fired to convert the glass frit into a tenacious dielectric film over both the metal electrode and the BeO dielectric, on which the electrode is deposited. A mask can be used over the parts of the metal electrode where electrical contact needs to be made to inductors distributed along the length of the electrode. The area under the mask is protected from being covered by the glass frit, such that these areas are not coated by glass after the frit is melted. An electrical contact then can be made at these masked locations.

If the glass frit cannot be made thick enough to stop the corona due to the glass frit cracking from thermal expansion and contraction under pulsed RF excitation, the glass frit over the deposited thin film metal electrode can be polished away to provide a continuous glass film over both the BeO dielectric and the metal thin film electrode, having a flat surface. A plate of a material such as silica or Macor can be placed over the electrode, with the edges of the dielectric plate extending past the electrode onto the glass frit over the BeO dielectric. Such an approach provides one possible solution to the cracking of the thick glass frit problem.

Another corona discharge problem that requires a solution before higher pressure RF excited $CO_2$ lasers can be efficiently operated and manufactured is the corona generation around the individual inductors, distributed between the lengths of the two electrodes. These inductors normally are contained within the gas chamber of the laser housing. Such inductors can equalize the voltage along the length of the two electrodes, such as is described in U.S. Pat. No. 4,353,188, issued on Sep. 28, 1982, which is hereby incorporated herein by reference. Since the gas mixture within the laser head is rich in He concentration to maintain good discharge stability, corona easily can be established around the coils of the inductors when the coils are located within the residual gas chamber. One solution to this problem is to pull the inductors out of the laser head and place them outside the laser head in the normal atmosphere where the amount of He is much lower.

An exemplary laser system in accordance with one embodiment can yield 58 W of average $CO_2$ laser output power from a 1.5 mm deep by 3 mm wide by 135 cm long folded 3-channel waveguide, pumped at 100 MHz with 12 KW peak power in 25 microsecond wide RF pulses at a rate of about 2 KHz. The gas mixture can include a $^{12}C\ ^{18}O_2$ isotope in a mixture of six parts He to one part $N_2$ to one part $CO_2$ gas at a pressure of 500 Torr. The output power from such a laser at the stated pressure can have higher output power, but a higher peak power RF supply can limit the output power. Only one ground electrode was liquid cooled in this embodiment. The output wavelength was 9.36 microns, which is an attractive wavelength for machining plastics.

The output power was found to increase with Pulse Repetition Frequency (PRF) up to a maximum average power of 58 W at 2 kHz. The power then began to decrease as the PRF was increased, due to increased heating of the gas. The addition of extra cooling (such as by flowing coolant through the hot metal electrode) would have enabled this laser to have a higher output power by allowing operation at a higher pulse repetition frequency.

The same laser was operated at 350 Torr with the same RF power supply at 2 KHz PRF. Approximately 72W of output power was obtained at this pressure. This higher power was possible at this pressure due to better diffusion cooling over the 500 Torr pressure. The highest pressure operation obtained with a stable discharge in these experiments was 600 Torr. Laser action was not attempted at the 600 Torr pressure because of the lack of a sufficiently high peak power RF supply required to operate the laser at its full potential at this higher pressure.

FIG. 1 illustrates the shape of an output power pulse as a function of time for the 350 Torr laser described above. Similar laser pulse shapes were obtained at 500 Torr. The amplitude of the peak of the initial "spike" of the output pulse illustrated in FIG. 1 is not to scale, due to the saturation of the detector. The peak power of the spike was estimated to be approximately 25 KW. The peak power of the "hump" of the laser radiation (the maximum after the initial spike) is approximately 2.3 KW. This pulse shape resembles the output of a mini-TEA laser excited with a DC pulse. Advantages of this RF TEA laser over a DC excited TEA laser include closed cycle operation, a longer lifetime associated with RF excitation over pulsed DC excitation and much lower voltages required to generate the discharge.

Figure 2:
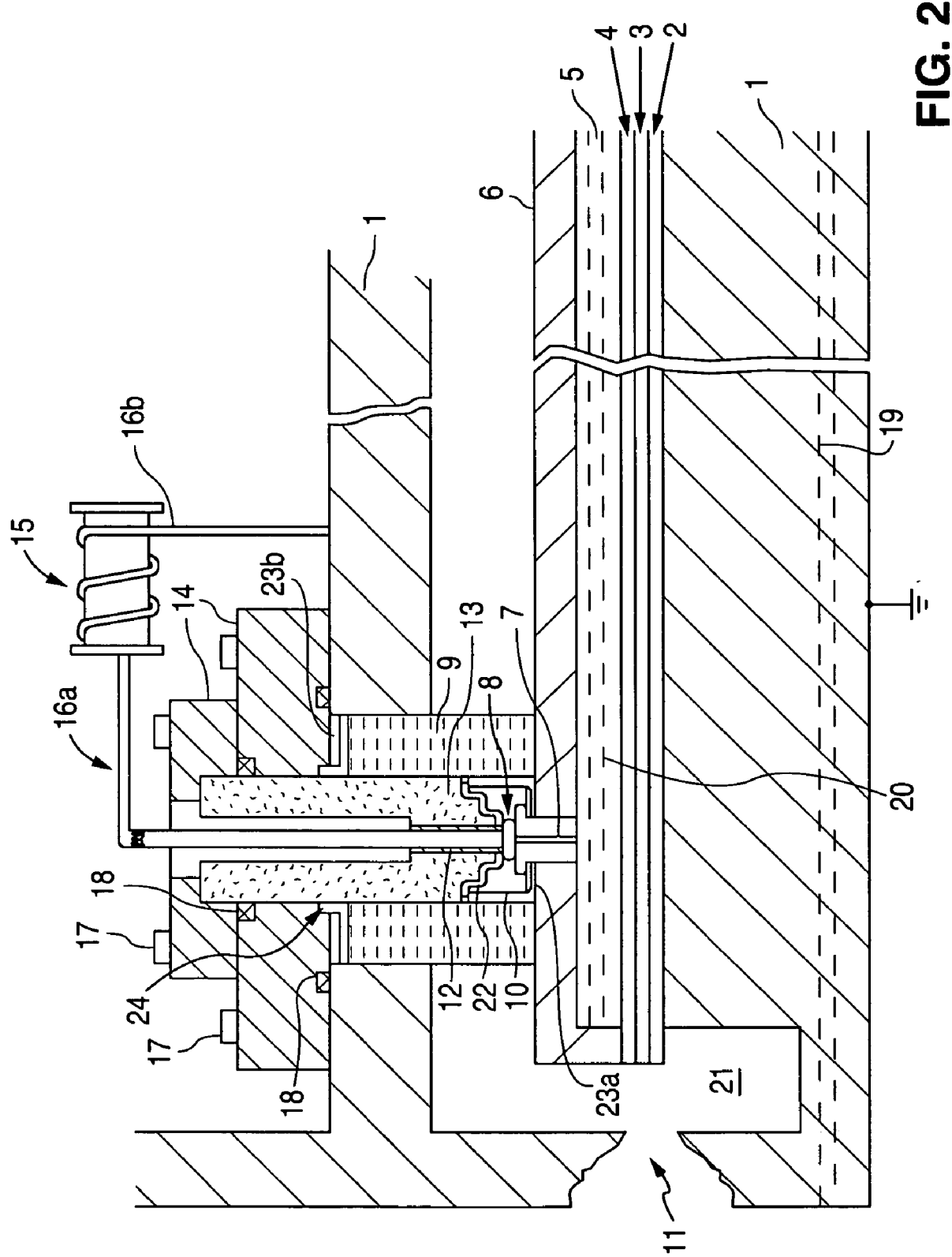
FIG. 2 is a partial cross section drawing illustrating a laser device in accordance with an embodiment of the present invention.

FIG. 2 shows a portion of one end of a high pressure, RF excited, sealed off $CO_2$ laser for wave-guide or slab laser configuration. A metal laser housing 1 acts as an electrical ground and contains the following: a gas plenum chamber 21 for the laser gas mixture, a laser resonator (not shown), a low dielectric constant encapsulating insulator 6 (e.g., silica, Macor) over a hot RF metal electrode 5 that may or may not contain cooling passages 20 (depending upon the amount of cooling required for the discharge), an upper BeO dielectric 4 that contains either the folded wave-guide channels or the slab channel 3, and a lower BeO dielectric 2 in contact with the ground electrode, which is part of the laser metal housing 1. The ground metal electrode has coolant passages 19. The assemblies for holding the metal folding mirrors and the output mirrors for the wave-guide laser configuration, or the assemblies for the unstable resonator mirrors and the output mirror for the slab laser, are not shown but are understood by those skilled in the $CO_2$ laser art.

Figure 3:
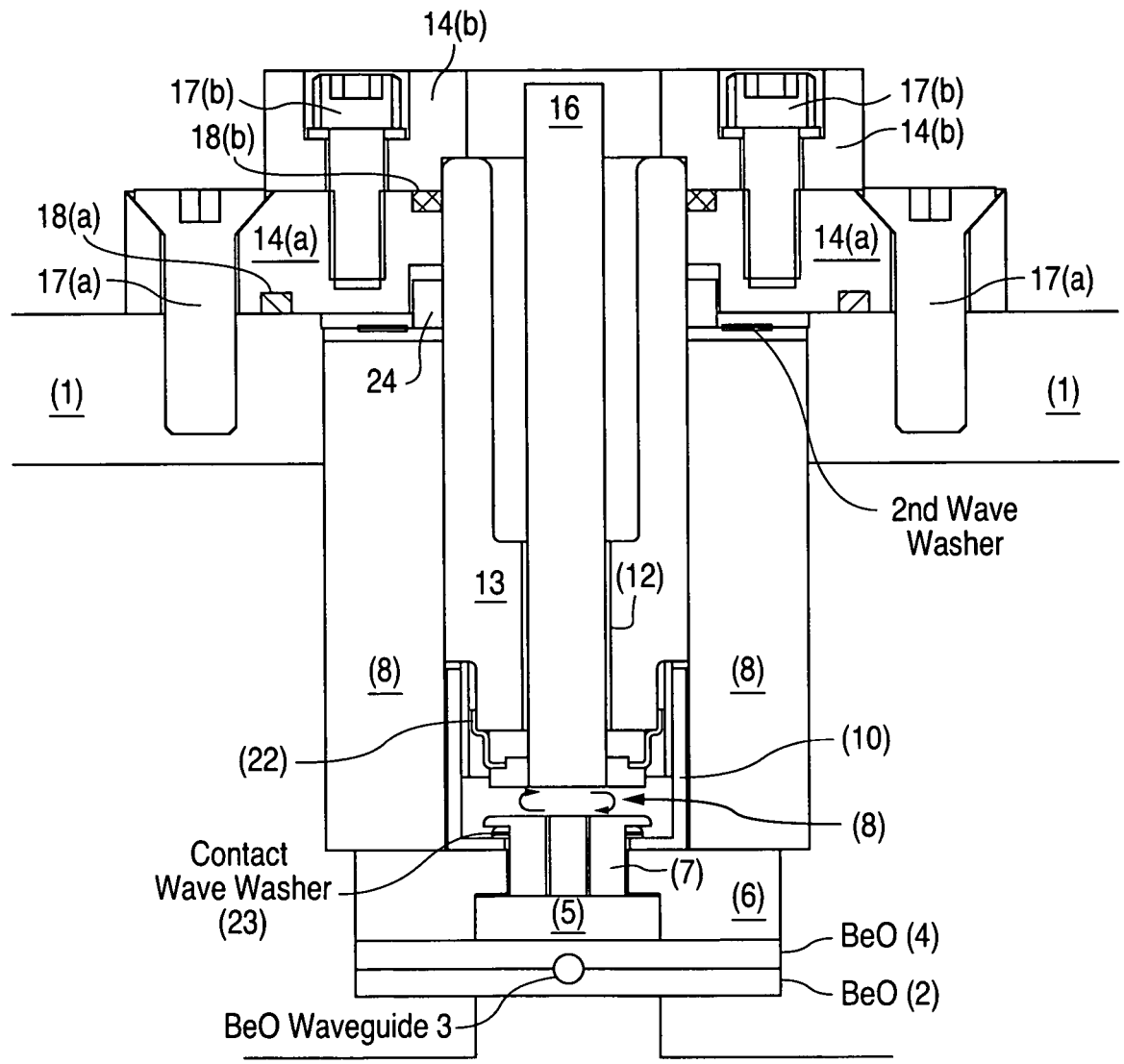
FIG. 3 is a detailed drawing illustrating the inductor/feedthrough assembly of the FIG. 2 laser device.

FIGS. 2 and 3 also illustrate an exemplary method for placing the inductors 15, connected between the hot and ground metal electrodes, outside of the gas plenum chamber 21 of the laser housing 1 in order to prevent corona around the inductors. Holes are provided along the length of the top of the laser housing 1 and through the encapsulating dielectric 6, where the inductors are to be contacted to the hot RF electrode 5, and the laser housing 1, which, as stated above, serves as an electrical ground. An RF feed-through, such as is available from the Wesco Company of Massachusetts, is used that consists of a centered copper electrical conductor hermetically sealed to the inside of a ceramic hollow cylinder 13, such as by a metal to ceramic brazing process. The other end of the inductor is connected to the grounded metal laser housing 1 by conductor 16(b). No part of the copper conductors comes in contact with the laser gas mixture within the gas plenum 21. The RF feedthrough assembly is inserted within a low dielectric constant insulator tube 9, which is made of a material such as silica or Macor. The bottom of the RF feedthrough has a nickel-plated metal contact 22 to cover the end of the cooper conductor. An aluminum contacting retaining cup 10 is placed at the bottom of the low dielectric constant sleeve 9, and a contacting wave washer 23 is inserted over the hole at the bottom of the retaining cup 10. An aluminum electrical contact button is inserted through the hole in the bottom of the retaining cup 10 and containing washer 23. The RF feedthrough has a contacting spring 8 that presses against the contacting button 7, the wave washer 23 and the aluminum cup 10 assembly to ensure good electrical contact is made between the hot RF aluminum electrode 5, the contacting button 7, the wave washer 23, the aluminum cup 10 and the nickel coated contact seal 22 over the copper conductor of the RF feedthrough 13. The hole through the aluminum contacting button 7 is used for gas venting.

The electrical contacts between the retaining cup 10, containing washer 23, contact seal 22, contacting button 7 and springs 8 ensures an equal voltage potential around the gas filled space surrounding these items, thereby preventing the creation of corona within this space. An aluminum contacting ring 24 is placed over the low dielectric constant insulating cylinder 9 to make electric contact with the inside surface of the hole within the laser housing and the aluminum collars 14(a) and 14(b). This ensures that an equal potential is also maintained around the gas volume bounded by the laser housing 1, the aluminum ring 24, and the aluminum collar 14(a), thereby preventing the generation of corona within this referenced volume. Finally, a second aluminum collar 14(b) is provided on top of collar 14(a). Bolts 17 are used to apply pressure on the aluminum collars 14(a) so as to squeeze o-rings 18(a) and 18(b) to obtain a vacuum seal for the gas plenum chamber of the laser housing. These inductor feedthrough assemblies are provided as required down the length of the hot RF electrode. About eight inductors suffice for an electrode length of approximately 45 cm in one embodiment.

Cross cuts across the BeO surface containing the folded wave-guides or the rectangular slab are machined in the BeO to provide pressure release for the heated gas within the discharge under pulsed operating condition. These pressure release "ports" are used to eliminate acoustic resonances. Such resonances reduce the operational performance of the laser, such as by affecting mode quality, power output, amplitude stability, and pointing stability.

FIG. 3 illustrates an enlarged view of the inductor/feedthrough assembly of FIG. 2, carrying over reference numbers where appropriate. For simplicity, only one round wave-guide channel is shown. The wave-guide channels are folded in a saw tooth manner to create multiple passages, in order to shorten the length of the wave-guide laser. The channels can be semi-circular or rectangular in cross section. A single rectangular cross-section channel constitutes a slab configuration.

Figure 4A:
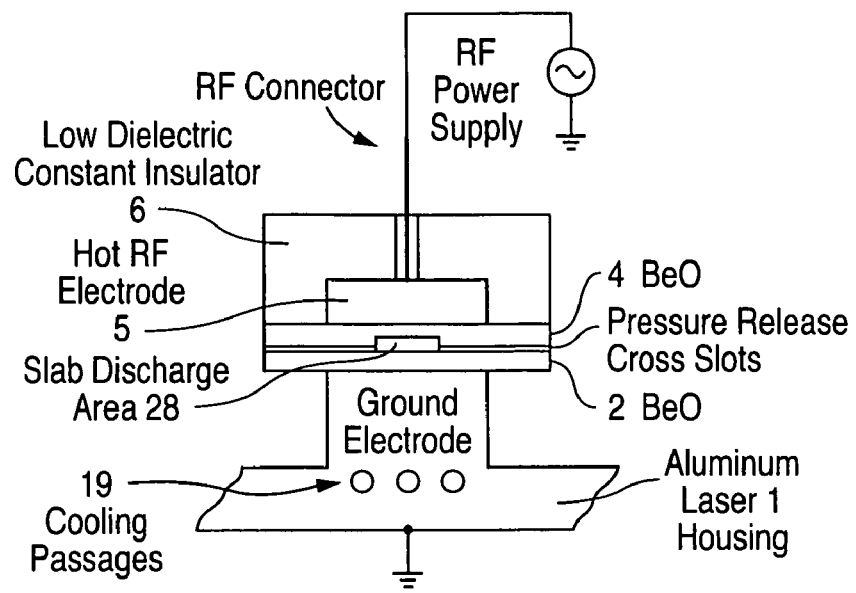
FIGS. 4A, 4B and 4C are drawings illustrating, respectively, the primary components of a high pressure laser, a corresponding circuit diagram and details of the FIG. 4A laser, all in accordance with an embodiment of the present invention.
Figure 4B:
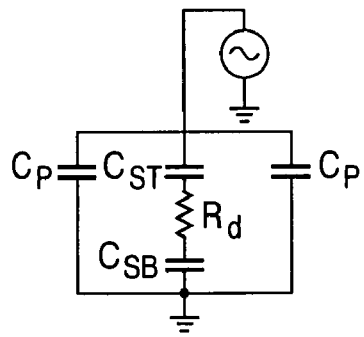

A more simplified illustration of the primary components of the high pressure laser, including the hot and ground electrodes, the encapsulating dielectric and the BeO dielectrics inserted between the two electrodes, is shown in the end view of FIG. 4A. The associated elementary electric equivalent circuit of the FIG. 4A structure is shown in FIG. 4B. In this case, a slab laser channel 28 was chosen as an illustration in FIGS. 4A and 4B.

Figure 4C:
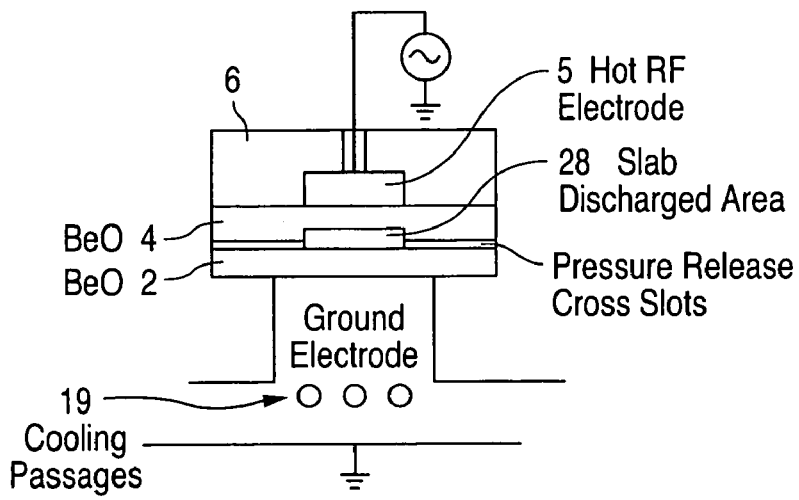

The circuit of FIG. 4B has a parallel capacitance "$C_p$" on each side of the discharge. The discharge is represented as a resistance $R_d$ with a series of capacitances on the top ($C_{ST}$) and bottom ($C_{SB}$) of the discharge ($R_d$). While adding some benefit to the stability of the discharge, the parallel capacitances have the undesirable effect of "shunting" RF energy to ground past the discharge $R_d$. This RF energy loss can reduce the efficiency of the laser and should be minimized where possible. The value of $C_p$ in FIG. 4B can be minimized by making the width of the hot RF electrode 5 approximately equal to the width of the discharge 28, as illustrated by FIG. 4C. This reduces $C_p$ to essentially the capacitance created by the "fringing" electric fields from the hot electrode 5 through the encapsulating dielectric 6 and the BeO dielectrics 2, 4 to ground. The over-hang of the BeO 2, 4 past the electrodes 5, as well as the over-hang of the encapsulating low dielectric constant insulator 6, illustrated in FIG. 4C, ensures that the resistance along the surfaces of the BeO 2, 4 and the low dielectric insulator 6 over-hangs to the ground electrode is, to first order, much larger than the impedance Z created by the series reactances of $C_{ST}$, $C_{SB}$ and the discharge resistance $R_d$. This ensures that most of the RF energy goes through the discharge and not along the mentioned surfaces. The reactance of the parallel capacitance should, at least in most embodiments, be much larger than Z.

The preliminary results shown by FIG. 1 were obtained with the arrangement of FIG. 4A, except that a 3-channel Z folded wave-guide configuration with the width twice the height of the wave-guide was used instead of the single rectangular slab channel 28 shown in FIG. 4A. In the slab laser configuration, the width of the guide is normally several times larger than the height of the guide.

Figure 5:
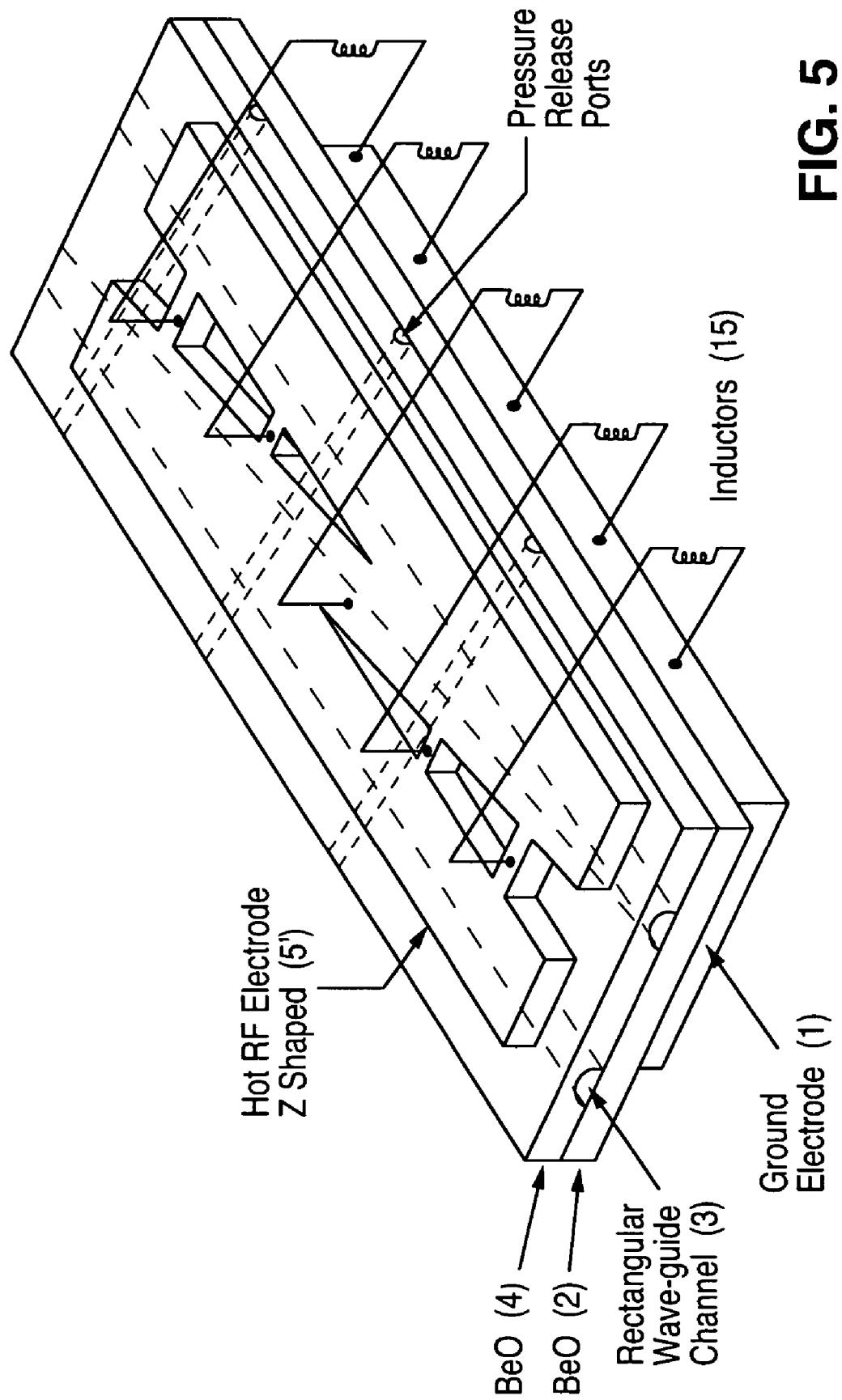
FIG. 5 is a perspective drawing illustrating a folded Z patterned waveguide in accordance with an embodiment of the present invention.
Figure 7A:
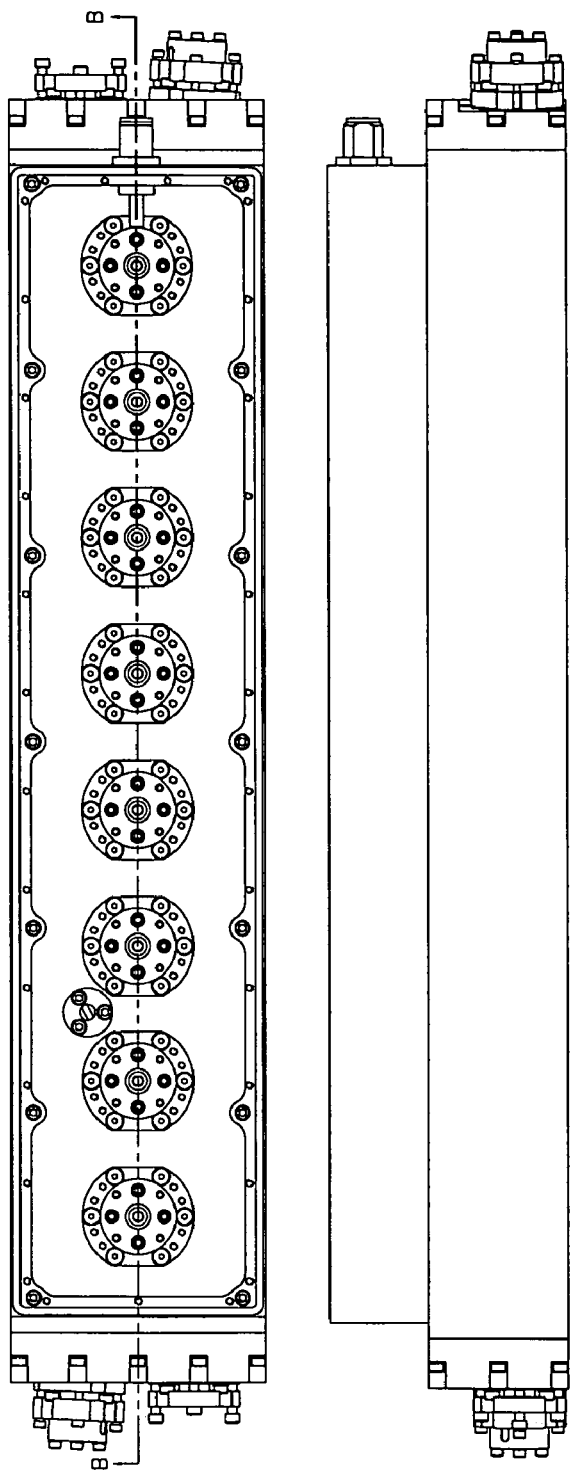
FIGS. 7A-7G provide drawings of a Z-folded wave-guide, sealed off, RF excited, high gas pressure $CO_2$ laser in accordance with an embodiment of the present invention.
Figure 7B:
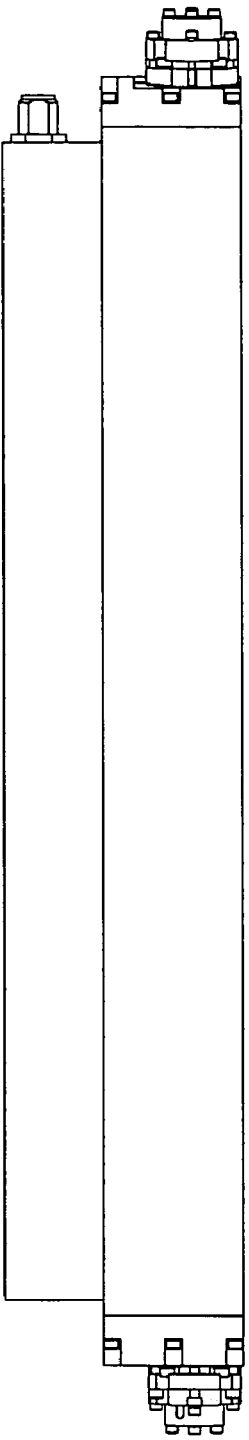
Figure 7D:
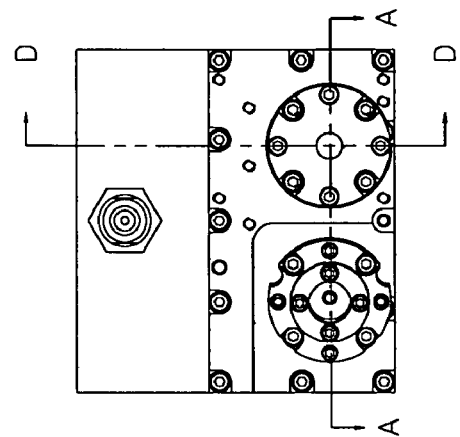
Figure 7C:
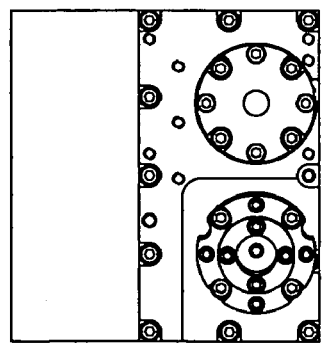
Figure 7E:
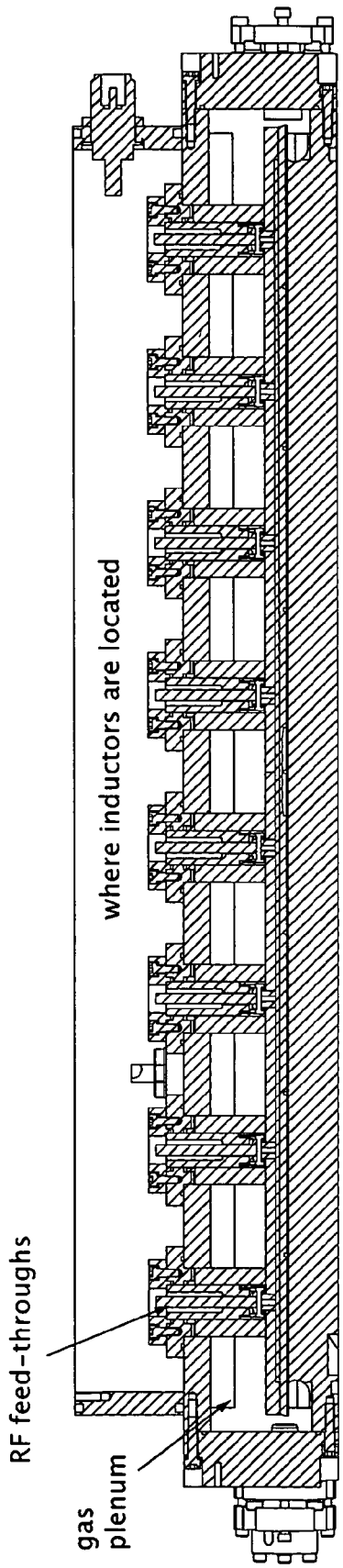
Figure 7F:
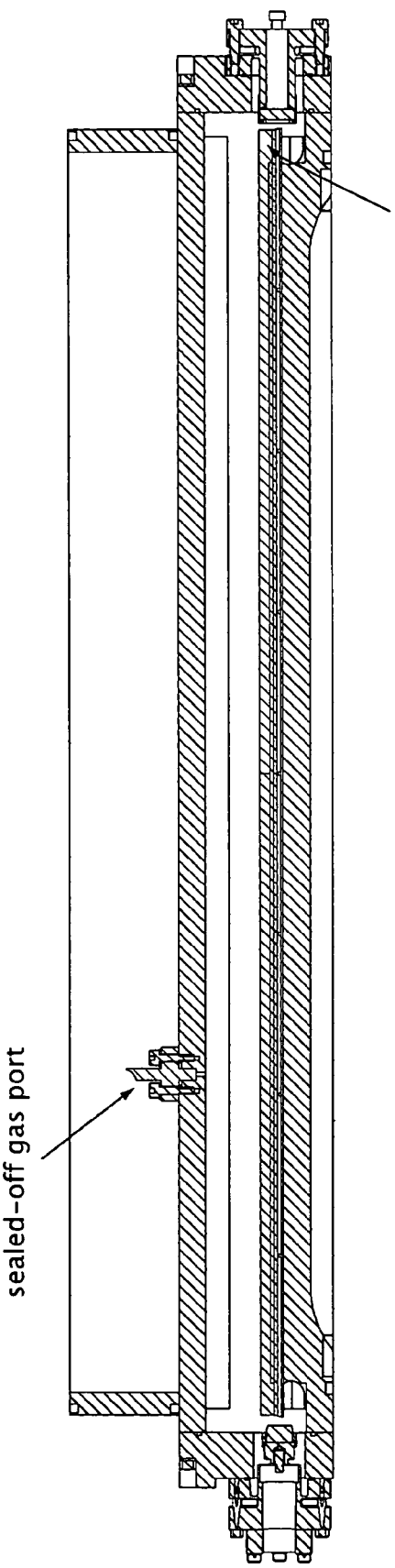
Figure 7G:
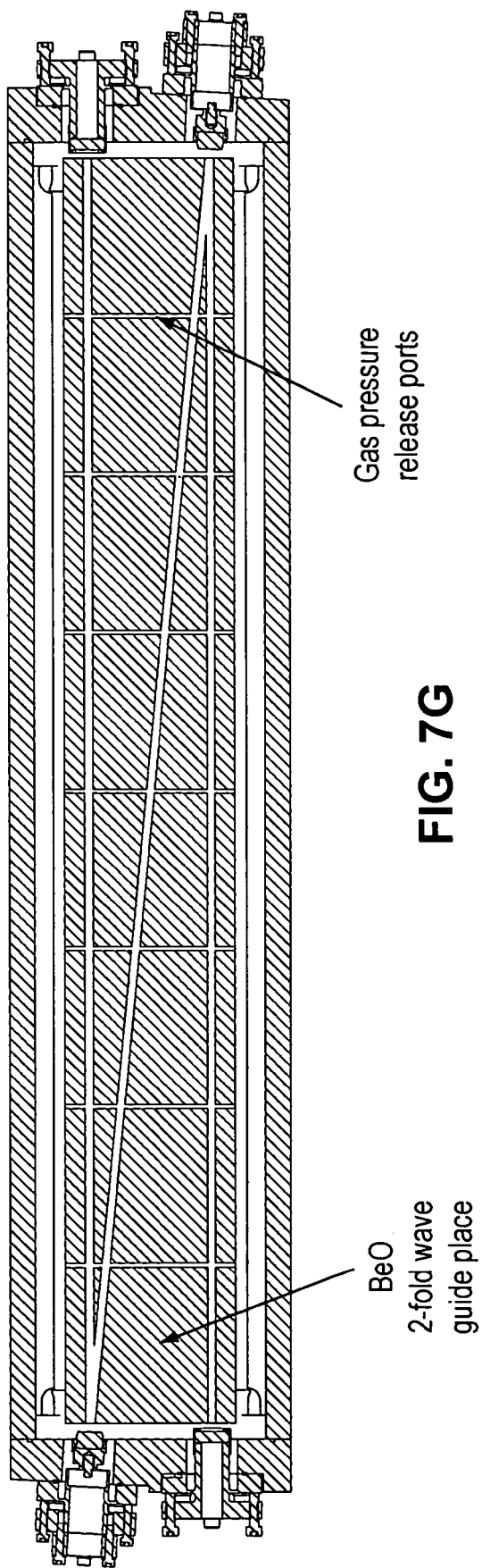

In the case of the folded waveguide laser, minimizing the parallel capacitances can require patterning of the hot electrode to match the pattern of the folded waveguide channels, such as is shown in schematic form in FIG. 5. FIG. 5 shows a folded Z patterned waveguide, but other configurations can be used. The width of the metal electrode can be determined by the structure rigidity desired, as well as the amount of parallel capacitance that can be tolerated in the laser design. The widths of the arms of the patterned electrode shown in FIG. 5 are exaggerated for illustration purposes. The cross-braces shown connecting the two adjacent arms of the Z pattern are used to obtain rigidity (if required) for long and thin arms, and also for connecting the inductors to the electrode down the centerline of the metal electrodes. Not shown in FIG. 5 is the low dielectric insulator machined to encapsulate the illustrated patterned electrode structure that is placed over the electrode. The inductors are connected to the metal electrode through the low dielectric constant encapsulating insulator cover with the use of the RF feed through assembly such as is shown in FIGS. 2 and 3.

Figure 6A:
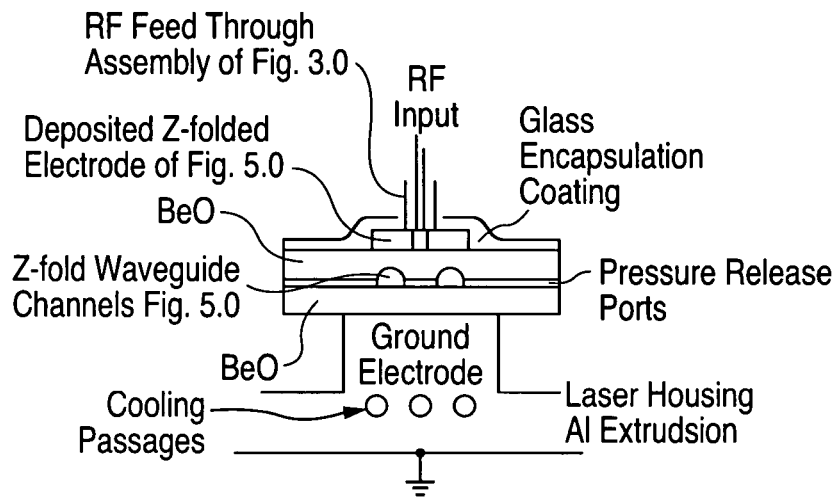
FIGS. 6A and 6B are partial cross section drawings of assemblies that include the FIG. 5 waveguide.

Another fabrication approach for the structure illustrated by FIG. 5 is to deposit the metal electrode, in thin film form, directly onto the top surface of the BeO bar that contains the wave-guide channels. Any appropriate metal deposition technique can be used to deposit the electrode. The portion of the deposited thin film electrode where the RF connections to the inductors are to occur is then masked. A glass frit can be deposited over the BeO bar and the deposited thin film metal electrode. The glass frit is fired to convert the frit to a hard, smooth glass surface encapsulating the metal electrode in a low dielectric constant insulator, except for locations that were previously masked for allowing electrical contact between the electrode and the inductors. An example of this structure is schematically illustrated in FIG. 6A.

Figure 6B:
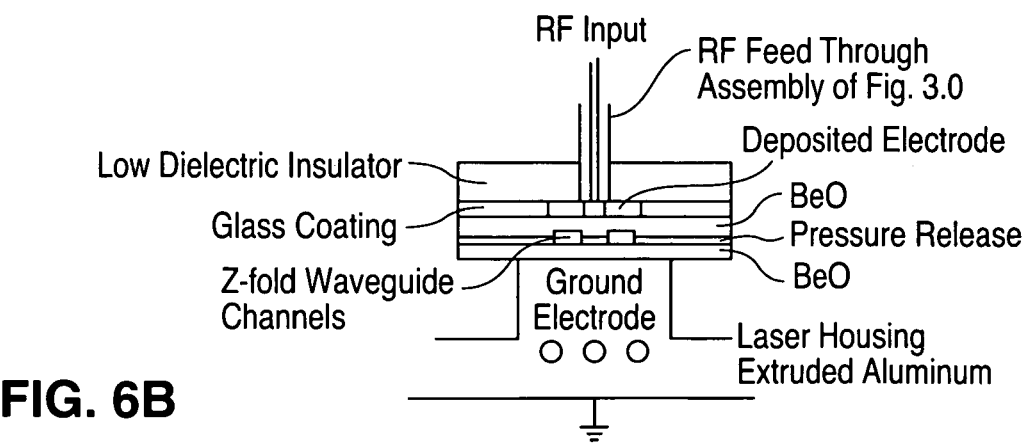

If the glass covering cannot be made sufficiently thick to prevent corona, such as may be due to cracking from alternating contraction and expansion with temperature as the laser is turned on and off, an insulating plate of low dielectric material can be placed over the glass/metal electrode structure as shown in FIG. 6B. If the step over the deposited metal electrode is too high, such that corona occurs in the gap between the two dielectrics (here the glass fit and the low dielectric constant insulator), the glass can be polished down to the deposited metal electrode so that a smooth transition and a tight fit is made between the metal electrode/glass frit covering surrounding the metal electrode and the low dielectric insulator placed over the structure, in order to complete the encapsulation, as shown in FIG. 6B.

FIG. 7A-7G illustrate an exemplary assembly of a Z-folded wave-guide, sealed off, RF excited, high gas pressure $CO_2$ laser in accordance with one embodiment. Not shown for simplicity are the eight inductors to be connected to the eight hermetically sealed RF feedthroughs and the grounded laser housing. Also not shown is the metal cover that is placed over the inductor housing to prevent RF emission from the laser housing.

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

What is claimed is:

1. A $CO_2$ laser system, comprising:
an electrically conductive laser housing including at least one output window and a plurality of mirrors forming a laser resonator;
upper and lower electrodes operable to energize $CO_2$ gas in the laser system;
a first dielectric element in contact with the lower electrode;
a second dielectric element in contact with the first dielectric element opposite the lower electrode, and in contact with the upper electrode, said dielectric elements defining a laser channel therein;
an insulator encapsulating the upper electrode;
an insulated feed through formed in the housing;

a pulsed RF power supply having one input connected to said upper electrode via said feed through, said upper electrode being the hot electrode and wherein the RF return path is connected to the laser housing which is at ground potential along with the lower electrode; and an inductor in the RF path located outside of the housing.

2. A laser system according to claim 1, wherein:
the insulator is a low dielectric constant encapsulating insulator.

3. A laser system according to claim 1, wherein:
the insulator contains a plurality of cooling passages.

4. A laser system according to claim 1, wherein:
at least one of the first and second dielectric elements is formed of a BeO ceramic.

5. A laser system according to claim 1, wherein:
the laser channel is one of a folded waveguide channel and a slab channel.

6. A laser system according to claim 1, wherein:
the laser housing is a metal housing.

7. A laser system according to claim 1, wherein:
at least one of the upper and lower electrodes includes cooling passages therein.

8. A laser system according to claim 1, further comprising:
a source of coolant for the laser system.

9. A laser comprising:
a sealed, electrically conductive housing containing a laser gas;

first and second electrodes for exciting the laser gas;

a pair of opposed ceramic members, located between the electrodes and defining the discharge region;

an insulator encapsulating the exposed regions of the first electrode to isolate the first electrode from the laser gas;

an insulated feed through formed in the housing;

a pulsed RF power supply having one input connected to said first electrode via said feed through, said first electrode being the hot electrode and wherein the RF return path is connected to the laser housing which is at ground potential along with the second electrode; and an inductor in the RF path located outside of the housing.

10. The laser as recited in claim 9, wherein said second electrode is formed integrally with the housing.

11. The laser of claim 9, wherein said ceramic members define a slab shaped discharge region.

12. The laser of claim 9, wherein said ceramic members define a folded waveguide discharge region.

* * * * *